(No Model.) 3 Sheets—Sheet 3.
W. P. LANHAM.
CORN PLANTER.
No. 290,070. Patented Dec. 11, 1883.
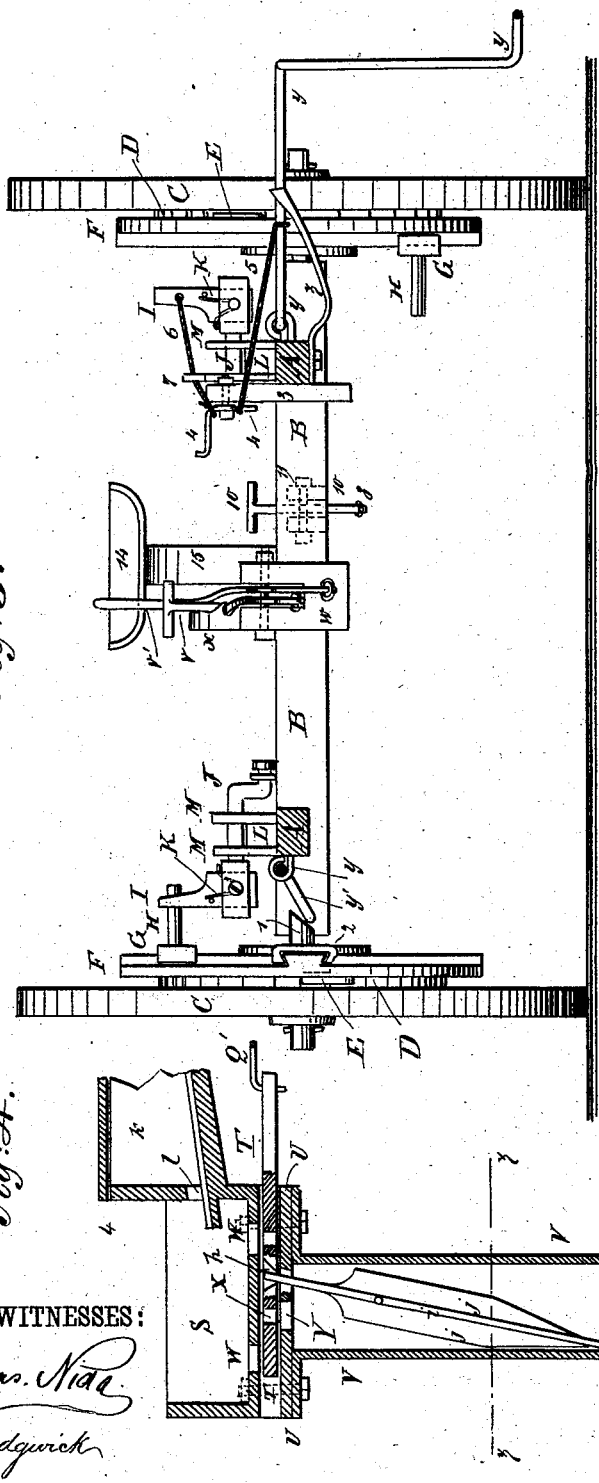
WITNESSES:
INVENTOR:
W. P. Lanham
BY 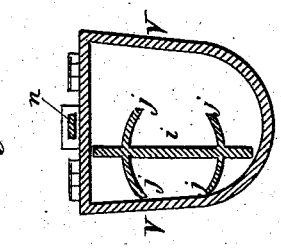
ATTORNEYS.

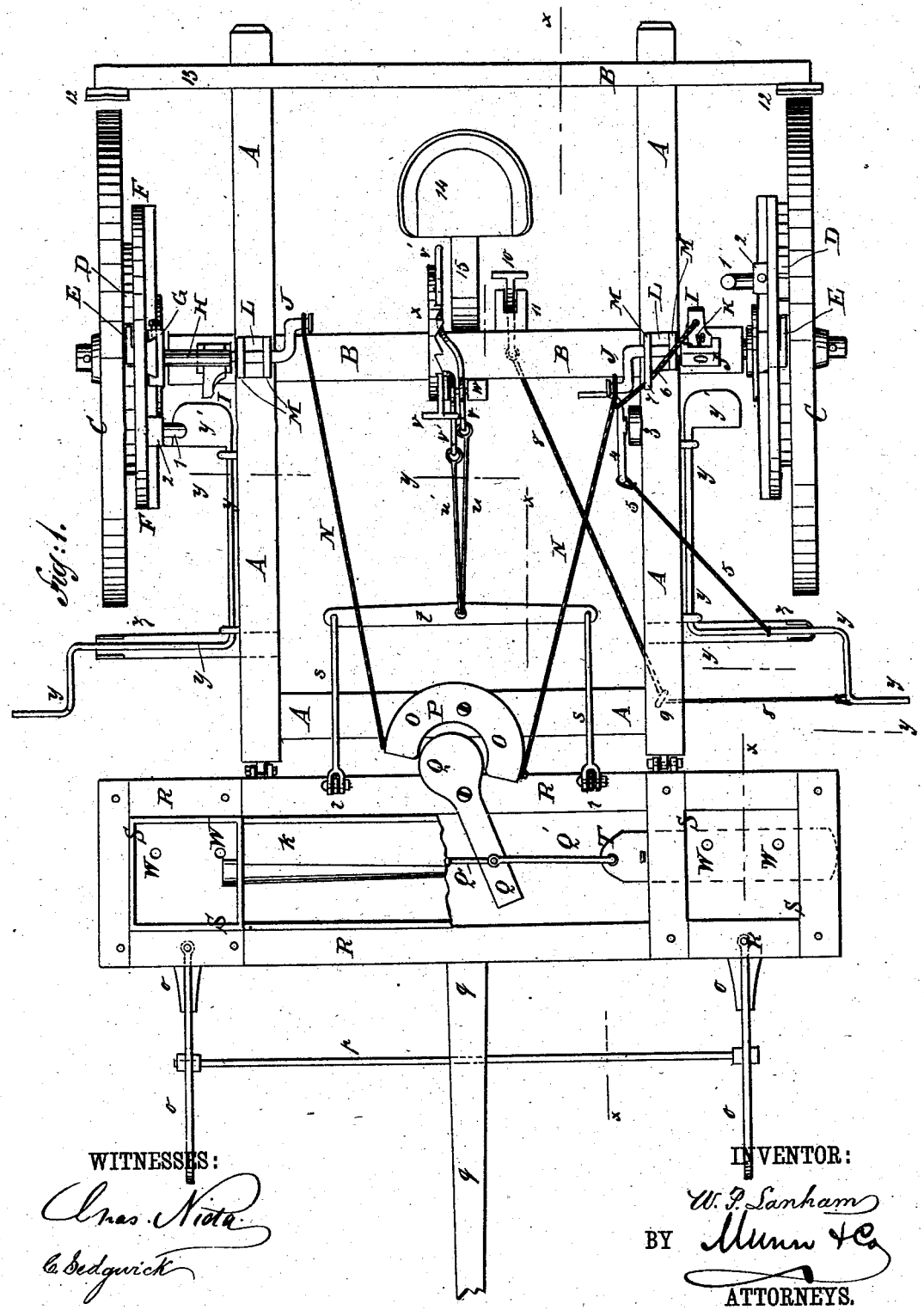

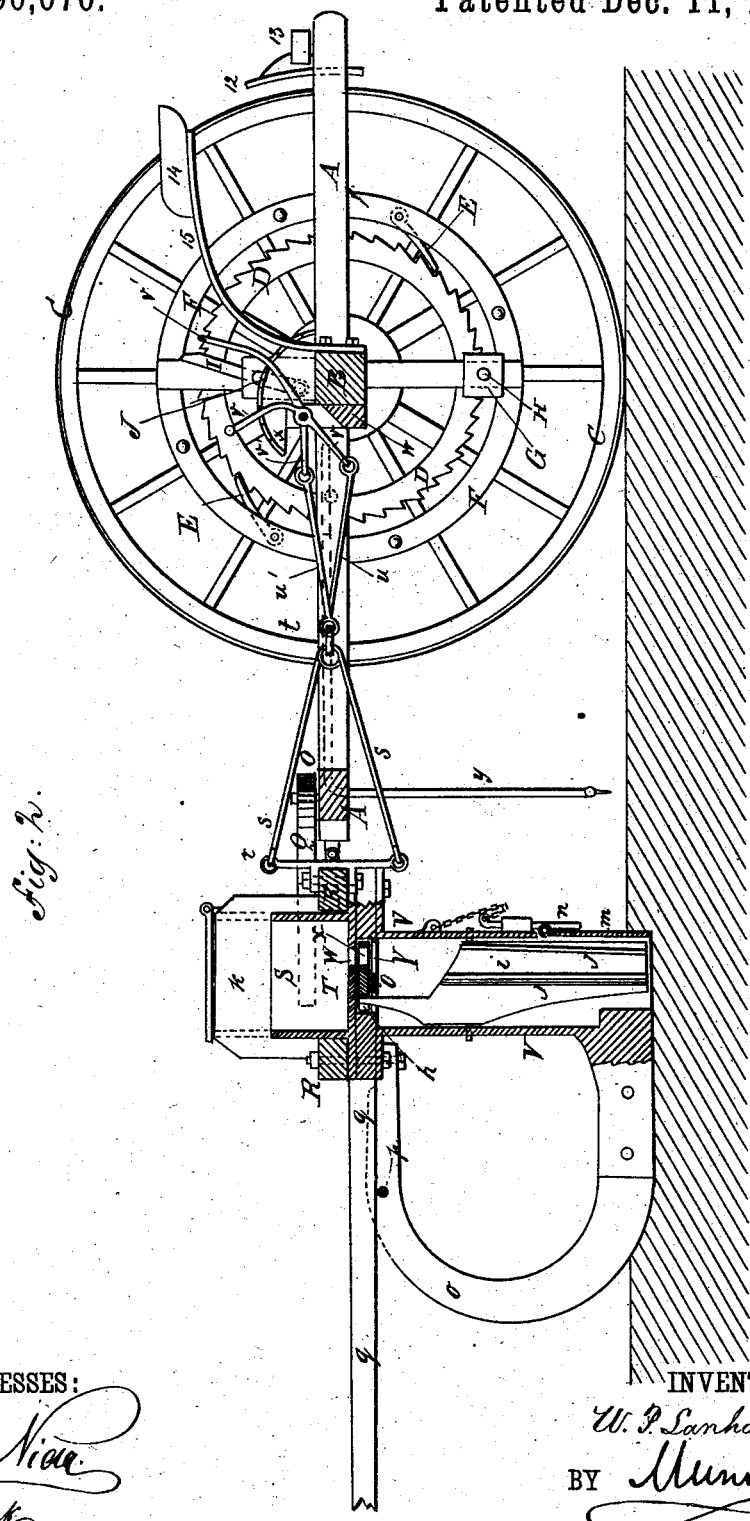

UNITED STATES PATENT OFFICE.

WILLIAM P. LANHAM, OF STAR, MISSOURI.

CORN-PLANTER.

SPECIFICATION forming part of Letters Patent No. 290,070, dated December 11, 1883.

Application filed June 12, 1883. (No model.)

*To all whom it may concern:*

Be it known that I, WILLIAM P. LANHAM, of Star, in the county of Barry and State of Missouri, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement, parts being broken away. Fig. 2, Sheet 2, is a sectional side elevation of the same, taken through the broken line $x\,x\,x\,x$, Fig. 1. Fig. 3, Sheet 3, is a sectional front elevation of the same, taken through the broken line $y\,y\,y\,y$, Fig. 1. Fig. 4, Sheet 3, is a sectional front elevation of a part of the seed-dropping mechanism, taken through the seed-box and conducting-spout. Fig. 5, Sheet 3, is a horizontal section of the same, taken through the line $z\,z$, Fig. 4. Fig. 6, Sheet 3, is a plan view of a seed-dropping slide, part being broken away. Fig. 7, Sheet 3, is a longitudinal section of a part of the same, taken through the line $v\,v$, Fig. 6. Fig. 8, Sheet 3, is a cross-section of the same, taken through the line $w\,w$, Fig. 6.

The object of this invention is to facilitate the operation of corn-planting, and to promote accuracy in such planting and convenience in operating the planters.

The invention consists in a corn-planter constructed with drive-wheels having ratchet-wheels attached to them, and provided with adjustable pawl-carrying wheels having adjustable arms to engage with arms connected with cranks, which are connected by cords with a semicircular plate having a semicircular lever connected with the seed-dropping slides, so that the said slides will be operated by the revolution of the drive-wheels. The seed-dropping slides are slotted to receive separable blocks provided with seed-receiving apertures and supporting-points, and held in place by clamping-blocks, whereby the seed-dropping slides can be arranged to drop more or less seed. Within the conducting-spouts are pivoted vibrating plates provided with side flanges, and operated by the seed-dropping slides, whereby the seed will be dropped in a bunch. To the hinged frame of the planter are attached upright bars connected at the ends by V-shaped rods with a cross-bar, which is connected by inclined rods with levers pivoted to a support attached to the axle, so that the runners can be raised from or forced down upon the ground. The pawl-carrying wheel is provided with adjustable slides and arms, to engage with crank-arms of markers connected with the frame, and held up by springs, so that the said markers will be forced down to mark the soil by the revolution of the drive-wheels. The projecting arm of the crank that operates the seed-dropping slides and the markers are connected by cords with foot-levers, for throwing the seed-dropping mechanism and the markers out of gear. With the markers are connected cords and foot-levers for forcing the said markers down upon the soil, all constructed and operating as will be hereinafter fully described.

A represents the frame, B the axle, and C the wheels, of the rear part or carriage of the planter.

To the hub or spokes of the wheels C are attached ratchet-wheels D, with the teeth of which engage pawls E, pivoted to the rims of the wheels F, placed upon the inner ends of the hubs of the wheels C, and kept in place by pins, screws, collars, or other suitable means, so that the wheels F can be turned forward by hand, to adjust the seed-dropping mechanism when starting in at the side of the field. One of the spokes of each of the wheels F has grooves, rabbets, or bevels in its opposite sides to receive a slide, G, which can be secured in place adjustably by set-screws or other suitable means, and has an inwardly-projecting arm, H, attached to or formed upon it, to strike against and operate the lever I. The lower end of the lever I is hinged in a notch or slot in the outer end of the shaft of the crank J, and its upper end is held outward by a spring, K, connected with it and with the said crank-shaft. The shaft of the crank J revolves in a half-bearing in the upper end of the short stud L, the lower end of which is attached to the side bars of the frame A, and is kept in place in the said half-bearing by U-shaped bars M, passing over it and bolted to the sides of the said stud L.

To the crank J are secured the ends of the cords, chains, or rods N, the other ends of which are attached to the ends of the semicircular plate O. The plate O is pivoted at the center, and with its convex edge to the rearward, to the forward cross-bar of the frame A.

In the forward edge of the plate O is formed a semicircular recess, P, to receive the rounded rear end of the lever Q, which is pivoted to one of the cross-bars of the frame R, hinged to the frame A, and that carries the seed-boxes S. The forward end of the lever Q is connected by rods Q′ with the inner ends of the seed-dropping slides T, that work in grooves in the upper sides of the plates U, placed upon the flanged upper ends of the conducting-spouts V. The flanged upper ends of the spouts V, the grooved plates U, and the bottoms of the seed-boxes S are secured to each other and to the frame R by bolts.

In the bottom of each seed-box S are formed two discharge-openings, W, to allow the seed to pass to the slide T and enter the openings X in the said slide T, by which the seed is carried to and dropped through the discharge-opening Y in the middle part of the plate U into the conducting-spout V. The seed-carrying openings X of the slide T are formed in small plates Z, placed in the rounded inner ends of slots $a$, formed in the slide T, upon the opposite sides of its center, where they are secured in place by points $b$, one of which enters a hole in the solid middle part of the said slide T and the other enters a hole in the block $c$, that slides in the outer part of the slot $a$. The side edges of the blocks $c$ have grooves $d$ formed in them, to receive the tongues $e$, formed in the inner edges of the end parts of the slide T. The blocks $c$ have long tenons $f$, formed upon their outer edges, to enter mortises in the end pieces of the slide T, where they are secured in place by set-screws $g$, as shown in Figs. 6 and 7. With this construction, as more or less seed is to be dropped for a hill, or as larger or smaller seeds are to be planted, the plates Z can be taken out and replaced by others having larger or smaller seed-receiving openings.

In the middle part of the slide T is formed a recess, $h$, to receive the upper end of the plate $i$, placed within the conducting-spout V, and pivoted at its edges to the front and rear sides of the said conducting-spout V.

Upon the opposite sides of the plate $i$ are formed, or to them are attached, flanges $j$, to come in contact with the sides of the conducting-spout V and adapt the said vibrating plate $i$ to serve as a valve to receive the seed from the seed-dropping slide T and detain it, so that it will be dropped to the ground in a bunch at the next movement of the said plate $i$.

To the frame R, between the said seed-boxes S, is attached a long box, $k$, to serve as a reservoir to carry seed, and from which the seed passes through discharge-openings $l$ in the ends of the said reservoir into the said seed-boxes S. The bottom of the reservoir $k$ is inclined from its center toward each end, so that the seed will flow readily toward each end, and thus keep both seed-boxes S supplied.

In the rear side of each conducting-spout V is formed an opening to give convenient access to the interior of the said spout, to clear it out should it become clogged, which opening is closed by a door, $m$, fastened shut by a bolt, $n$, or other suitable means.

To the lower end of the conducting-spouts V are attached the forked rear ends of the runners $o$, the forward ends of which are curved upward and rearward, and are connected by a cross-bar, $p$.

To the center of the cross-bar $p$ and of the cross bar or bars of the frame R is attached the tongue $q$.

To the rear cross-bar of the frame R, upon the opposite sides of and equally distant from its center, are attached the middle parts of two upright bars, $r$, to the ends of each of which are attached the ends of a V-shaped bar, $s$, or of two bars, the angles or rear ends of which are attached to the ends of the cross-bar $t$.

To the center of the cross-bar $t$ is attached the forward ends of two bars, $u\ u'$, one, $u$, of which inclines downward and is pivoted to the end of the lever $v$, and the other is pivoted to the end of the lever $v'$. The levers $v\ v'$ are pivoted to a support, $w$, attached to the axle B, and their upper ends incline rearward and forward, respectively, so that by pressing the upper end of the lever $v$ downward, the runners $o$ will be raised from the ground, and by pressing the upper end of the lever $v'$ downward, the runners $o$ will be pressed downward and caused to run deeper in the ground. The upper parts of the levers $v\ v'$ move along the rear and forward parts, respectively, of the toothed catch-bar $x$, attached to the axle B.

In the bearings attached to the outer sides of the frame A work arms $y$, the forward parts of which, a little in front of the drive-wheels C, are bent downward and then outward, and have knives upon their outer ends, to adapt them to serve as markers to mark the ground opposite the hills planted, so that the planting can be done in accurate cross-row. The markers $y$ are supported out of contact with the ground by springs $z$, the inner ends of which are attached to the side bars of the frame A in such positions that their outer ends will be beneath the outwardly-projecting parts of the said markers $y$.

Upon the rear ends of the markers $y$ are formed outwardly-projecting arms $y'$, which are made sufficiently heavy to hold the markers $y$ down upon the springs $z$, and which project into such positions as to be struck by the arms 1, attached to slides 2, moving upon grooved spokes of the wheel F, and secured in place by set-screws or other suitable means. By this construction the markers $y$ will be forced down to mark the ground opposite the hills by the revolution of the wheels C.

To standards 3, attached to the frame R, are pivoted foot-levers 4, the forward ends of which are connected by cords 5 with the downwardly-projecting parts of the markers $y$. The rear ends of the foot-levers 4 are connected with the hinged arms I by cords 6, which pass through guide-holes in the upper ends of uprights 7, attached to the frame R or standards L. With this construction, by operating the foot-levers 4 the arms I will be drawn inward and the markers $y$ will be raised, so that the planter can be conveniently turned, and the dropping of seed prevented while the planter is being turned.

To the downwardly-projecting parts of the markers $y$ are attached the ends of cords 8, which pass through guide-holes in hangers 9, attached to the lower sides of the side bars of the frame R, and are attached at their rear ends to the lower ends of foot-levers 10. The foot-levers 10 are pivoted to supports 11, attached to the axle B in such positions that they can be readily operated by the driver with his feet, to force the markers $y$ down to mark the ground when desired. The faces of the drive-wheels C are cleaned from adhering soil by scrapers 12, attached to the ends of the cross-bar 13, which is secured to the rear part of the frame A; or the bar 13 can be made movable and provided with a lever, so that it can be moved to and from the wheels C, as required.

14 is the driver's seat, which is attached to the upper end of the standard 15. The lower end of the seat-standard 15 is attached to the axle B.

Having thus fully described my invention, I claim as new and desire to secure by Letters Patent—

1. In a corn-planter, the combination, with the drive-wheels C and the seed-dropping slides T, of the ratchet-wheels D, the adjustable pawl-carrying wheels F, provided with adjustable arms H, the spring-pivoted arms and cranks I J, the cords N, the semicircular recessed plate O, and the lever Q, having rounded end, substantially as herein shown and described, whereby the said seed-dropping slides will be operated by the revolution of the drive-wheels, as set forth.

2. In a corn-planter, the combination, with the hinged frame R and the axle B, of the upright bars $r$, the V-shaped rods $s$, the cross-bar $t$, the inclined bars $u$ $u'$, and the levers $v$ $v'$ and catch-plate $x$, substantially as herein shown and described, whereby the hinged frame and its attachments can be raised and lowered, as set forth.

3. In a corn-planter, the combination, with the frame A, the drive-wheel C, the ratchet-wheel D, and the adjustable wheel F, having pawls E, of the slide and arm 2 1, the marker $y$, having weighted arm $y'$, and the spring $z$, substantially as herein shown and described, whereby the soil will be marked opposite the hills, as set forth.

4. In a corn-planter, the combination, with the frame A, the projecting arm I, and the spring-supported marker $y$, of the standard 3, the foot-lever 4, and the cords 5 6, substantially as herein shown and described, whereby the seed-dropping mechanism and the marker can be readily thrown out of gear, as set forth.

5. In a corn-planter, the combination, with the axle B and the markers $y$, of the cords 8 and foot-levers 10, substantially as herein shown and described, whereby the markers can be forced down to mark the soil, as set forth.

WILLIAM P. LANHAM.

Witnesses:
JACOB ZIKE,
B. N. REESE.